United States Patent
Jung et al.

(10) Patent No.: US 11,362,401 B2
(45) Date of Patent: Jun. 14, 2022

(54) SEPARATOR FOR LITHIUM SECONDARY BATTERY AND LITHIUM SECONDARY BATTERY INCLUDING THE SAME

(71) Applicant: LG Chem, Ltd., Seoul (KR)

(72) Inventors: Hye Ran Jung, Daejeon (KR); Young Geun Choi, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 269 days.

(21) Appl. No.: 16/341,771

(22) PCT Filed: Mar. 8, 2018

(86) PCT No.: PCT/KR2018/002790
§ 371 (c)(1),
(2) Date: Apr. 12, 2019

(87) PCT Pub. No.: WO2018/164517
PCT Pub. Date: Sep. 13, 2018

(65) Prior Publication Data
US 2020/0321584 A1    Oct. 8, 2020

(30) Foreign Application Priority Data

Mar. 10, 2017    (KR) .................... 10-2017-0030759
Mar. 8, 2018    (KR) .................... 10-2018-0027369

(51) Int. Cl.
*H01M 10/05*    (2010.01)
*H01M 50/46*    (2021.01)
(Continued)

(52) U.S. Cl.
CPC ....... *H01M 50/46* (2021.01); *H01M 10/0525* (2013.01); *H01M 50/463* (2021.01)

(58) Field of Classification Search
None
See application file for complete search history.

(56) References Cited

U.S. PATENT DOCUMENTS

2002/0012846 A1    1/2002    Skotheim et al.
2002/0182490 A1*   12/2002   Cho .................... H01M 4/139
                                                                429/144
(Continued)

FOREIGN PATENT DOCUMENTS

CN    1511351 A    7/2004
CN    1522453 A    8/2004
(Continued)

OTHER PUBLICATIONS

Hwang et al., "Bistable shapes of window-frame-shaped CFRP-laminated-composite and development of analytical model", The Korean Society of Mechanical Engineers Spring and Fall Conference, Dec. 2016, pp. 1341-1345. (Year: 2016).*

(Continued)

*Primary Examiner* — Maria Laios
*Assistant Examiner* — Angela J Martin
(74) *Attorney, Agent, or Firm* — Lerner, David, Littenberg, Krumholz & Mentlik, LLP

(57) ABSTRACT

The present invention relates to a separator for a lithium secondary battery, which includes a porous substrate, and a lithium metal layer formed on one side of the porous substrate, wherein the lithium metal layer is formed on an outer circumferential surface of the porous substrate and has a window frame shape with an empty interior, and a lithium secondary battery including the same.

5 Claims, 2 Drawing Sheets

(51) Int. Cl.
*H01M 10/0525* (2010.01)
*H01M 50/463* (2021.01)

(56) References Cited

U.S. PATENT DOCUMENTS

| | | |
|---|---|---|
| 2004/0179328 A1 | 9/2004 | Ando et al. |
| 2006/0057433 A1 | 3/2006 | Ando et al. |
| 2009/0246626 A1 | 10/2009 | Tasaki et al. |
| 2015/0033547 A1 | 2/2015 | Yang et al. |
| 2015/0357618 A1* | 12/2015 | Hiraoka ............. H01M 50/431 429/144 |
| 2017/0324073 A1 | 11/2017 | Herle |
| 2018/0183106 A1* | 6/2018 | Hong ................ H01M 10/0436 |

FOREIGN PATENT DOCUMENTS

| | | | | |
|---|---|---|---|---|
| CN | 103606644 | * | 2/2014 | ............. H01M 2/16 |
| CN | 103606644 A | | 2/2014 | |
| JP | S60207251 A | | 10/1985 | |
| JP | 2002324585 A | | 11/2002 | |
| JP | 2004-087251 A | * | 3/2004 | ............ H01M 10/05 |
| JP | 2004087251 A | | 3/2004 | |
| JP | 2007173615 A | | 7/2007 | |
| JP | 2008060130 A | | 3/2008 | |
| JP | 2009032408 A | | 2/2009 | |
| JP | 2009295400 A | | 12/2009 | |
| JP | 4591923 B2 | | 12/2010 | |
| JP | 2013084387 A | | 5/2013 | |
| JP | 2013125824 A | | 6/2013 | |
| JP | 5397404 B2 | | 1/2014 | |
| JP | 5680868 B2 | | 3/2015 | |
| KR | 20050116795 A | | 12/2005 | |
| KR | 20080080134 A | | 9/2008 | |
| WO | 2016112333 A1 | | 7/2016 | |
| WO | 2016204467 A1 | | 12/2016 | |

OTHER PUBLICATIONS

European Examination Report for Application No. EP 18764216.0 dated May 11, 2020, 5 pages.
Search report from International Application No. PCT/KR2018/002790, dated Jun. 15, 2018.
Hwagn, Yong-Sun, et al., "Bistable Shapes of Window-Frame-Shaped CFRP-laminated-composite and Developemnt of Analyatical Model." The Korean Society of Mechanical Engineers Spring and Fall Conference, Dec. 2016, pp. 1341-1345. (English translation of abstract only.).
Extended European Search Report including Written Opinion for Application No. EP18764216.0 dated Sep. 6, 2019.
Search Report from Office Action for Chinese Patent Application No. 2018800037229 dated Mar. 2, 2302; 2 pages.

* cited by examiner

SEPARATOR FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/002790 filed on Mar. 8, 2018, which claims priority from Korean Patent Application Nos. 10-2017-0030759, filed on Mar. 10, 2017, and 10-2018-0027369, filed on Mar. 8, 2018, all of which are incorporated herein by reference.

TECHNICAL FIELD

The present invention relates to a separator used in a lithium secondary battery and a lithium secondary battery including the same, and more particularly, to a separator for a lithium secondary battery, in which a lithium metal layer is formed on one side of a porous substrate, and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted. Nickel-metal hydride (Ni-MH) secondary batteries have mainly been used as power sources of the electric vehicles (EVs) and hybrid electric vehicles (HEVs), but research into the use of lithium secondary batteries having high energy density, high discharge voltage, and output stability has been actively conducted, and some of the research has been commercialized.

A lithium secondary battery consists of a structure in which an electrode assembly having a porous separator disposed between a positive electrode and a negative electrode, in which electrode collectors are respectively coated with active materials, is impregnated in a non-aqueous electrolyte including a lithium salt.

The lithium secondary battery is charged/discharged only by a lithium source of the positive electrode active material of the positive electrode and life characteristics are degraded when the reversible lithium source is insufficient. A technique for recycling the battery with degraded life characteristics by supplementing the lithium source through a method of injecting an additional electrolyte solution has been known, but it is inconvenient in that a process of making a passage for the further injection to the already completed cell and closing the passage again is necessary.

Thus, a lithium secondary battery, which includes a separate lithium electrode capable of separately supplementing lithium during the degradation of the battery, has been proposed. For example, Korean Patent Application Laid-open Publication No. 2005-0116795 discloses a secondary battery including an additional lithium electrode in addition to a positive electrode and a negative electrode. The document discloses the secondary battery in the form in which the additional lithium electrode is stacked and separated by a separator and at least one of the positive electrode and the negative electrode, and discloses a method in which a current collector of each electrode is exposed to the outside of the secondary battery through a terminal so that a lithium electrode terminal and at least one of the positive electrode terminal or the negative electrode terminal are connected to supply lithium ions to the positive electrode or the negative electrode during the degradation of the battery.

In terms of the fact that the process of making a passage for the further injection to the already completed cell and closing the passage again is not necessary, the method has an advantage of eliminating the inconvenience, but, since the separate lithium electrode is stacked with the positive electrode and the negative electrode to configure a cell, the method is disadvantageous in that an overall thickness of the cell is increased.

Japanese Patent Application Laid-open Publication No. 2002-324585 discloses a secondary battery which includes a third electrode further including a lithium metal in addition to a positive electrode and a negative electrode, but the third electrode is disposed away from an electrode assembly including the positive electrode and the negative electrode.

The method is advantageous in that the process of making a passage for the further injection to the already completed cell and closing the passage again is not necessary and the lithium metal does not increase the overall thickness of the cell, but, since the lithium metal is disposed on a side at a predetermined distance from the electrodes requiring supplement of lithium, the method is disadvantageous in that the supplement of lithium ions is not uniformly performed on the overall electrode.

Thus, there is a need to develop a lithium secondary battery in which a lithium source may be more effectively supplemented to an electrode while there is no inconvenience due to the formation of the separate passage for the supplement of lithium and a thickness or capacity of the battery is not affected.

DISCLOSURE OF THE INVENTION

Technical Problem

An aspect of the present invention provides a separator for a lithium secondary battery which includes a lithium metal layer capable of providing a lithium source to a secondary battery with degraded life characteristics.

Another aspect of the present invention provides a lithium secondary battery including the separator for a lithium secondary battery.

Technical Solution

According to an aspect of the present invention, there is provided a separator for a lithium secondary battery including a porous substrate; and a lithium metal layer formed on one side of the porous substrate, wherein the lithium metal layer is formed along an outer circumferential surface of the porous substrate and has a window frame shape with an empty interior.

According to another aspect of the present invention, there is provided a method of preparing a separator for a lithium secondary battery which includes:

forming an electrode active material layer by coating a porous substrate with an electrode active material slurry including an electrode active material and a binder.

According to another aspect of the present invention, there is provided a lithium secondary battery including:

a positive electrode; a negative electrode; and a separator disposed between the positive electrode and the negative electrode, wherein the separator includes a porous substrate; and a lithium metal layer formed on one side of the porous substrate, and the lithium metal layer is formed along an outer circumferential surface of the porous substrate and has a window frame shape with an empty interior, wherein the lithium metal layer surrounds edges of the positive electrode at a position spaced apart from the positive electrode.

Advantageous Effects

A separator for a lithium secondary battery according to the present invention includes a porous substrate including a lithium metal layer on one side thereof, wherein the lithium metal layer is formed on an outer circumferential surface of the porous substrate and is a window frame-shaped planar layer with an empty interior, and thus, when a lithium secondary battery, in which a positive electrode is disposed in the window frame-shaped interior formed by the lithium metal layer, is configured, the lithium metal layer may effectively supplement lithium ions to the positive electrode during the degradation of the lithium secondary battery.

BEST MODE FOR CARRYING OUT THE INVENTION

Figure 1:
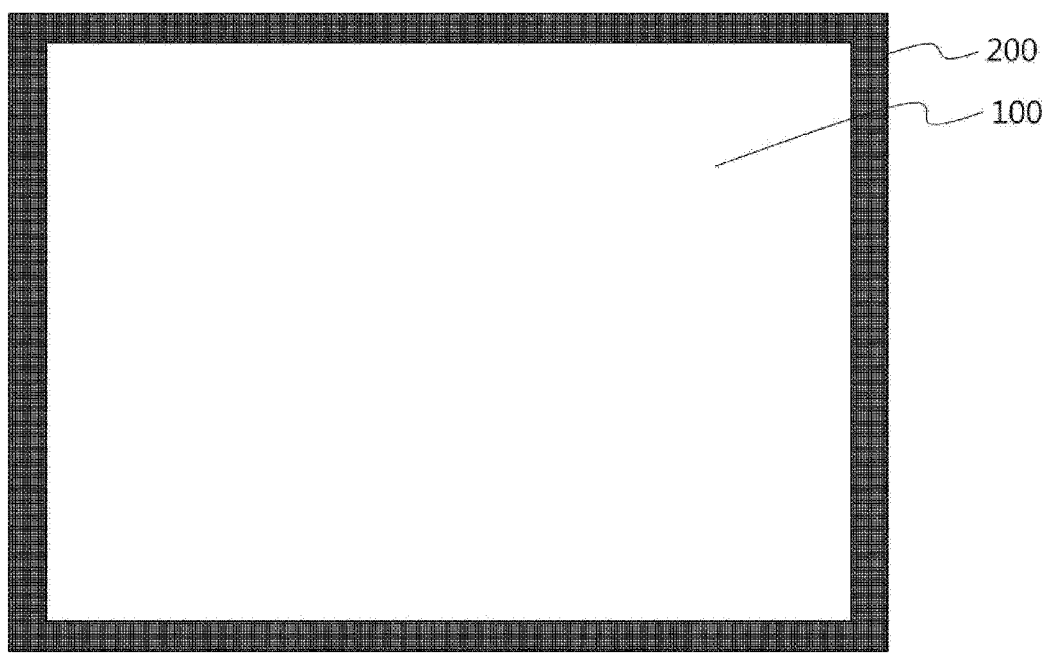
FIG. 1 illustrates an example of a separator for a lithium secondary battery according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A separator for a lithium secondary battery according to the present invention includes a porous substrate; and a lithium metal layer formed on one side of the porous substrate, wherein the lithium metal layer is formed on an outer circumferential surface of the porous substrate and is a window frame-shaped planar layer with an empty interior.

The porous substrate included in the separator for a lithium secondary battery according to an embodiment of the present invention is not particularly limited as long as it is a material which may be used as a separator for a lithium secondary battery, and, for example, an olefin-based polymer such as chemical resistant, hydrophobic polypropylene; and a sheet or non-woven fabric formed of glass fibers or polyethylene may be used. Specifically, the porous substrate may be a separator formed of at least one selected from the group consisting of polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene, polyethylene, polypropylene, polybutylene, polyvinylidene fluoride, polyethylene oxide, polyacrylonitrile, and a polyvinylidene fluoride-hexafluoropropylene copolymer.

A porosity of the porous substrate is not particularly limited, but, for example, may be in a range of 5% to 95%, particularly 20% to 80%, and more particularly 30% to 70%. In a case in which the porosity of the porous substrate is within the above range, since movement of an electrolyte solution is smooth, appropriate mechanical properties may be maintained while battery performance is not degraded, and thus, an internal short circuit between a positive electrode and a negative electrode may be prevented.

The porous substrate may have a thickness of 5 μm to 300 μm, particularly 10 μm to 100 μm, and more particularly 10 μm to 50 μm. In a case in which the porous substrate has a thickness within the above range, the porous substrate itself is not allowed to act as a resistance layer or a total thickness of the lithium secondary battery is not allowed to be increased while the porous substrate may exhibit appropriate mechanical properties.

The porous substrate may have an average pore size of nm to 100 nm, particularly 10 nm to 90 nm, and more particularly 30 nm to 50 nm. A pore size of the porous substrate denotes a diameter of the pore which is measured on a surface of the porous substrate. A method of measuring the average pore size is not particularly limited, but, for example, the average pore size may be measured by a nitrogen adsorption isotherm curve and a pore size distribution.

In a case in which the average pore size of the porous substrate is within the above range, since the movement of the electrolyte solution is smooth, the battery performance is not degraded and mechanical properties of the porous substrate may be appropriately maintained.

The lithium metal layer formed on the one side of the porous substrate may include a lithium metal, a lithium alloy, or a mixture thereof, and may specifically include a lithium metal.

The lithium metal layer is formed on an outer circumferential surface of the one side of the porous substrate. That is, the lithium metal layer does not entirely cover the one side of the porous substrate, and the lithium metal layer is not formed on an interior, but preferably formed only on the outer circumferential surface of the porous substrate. Thus, the lithium metal layer has a window frame shape with an empty interior.

Figure 2:
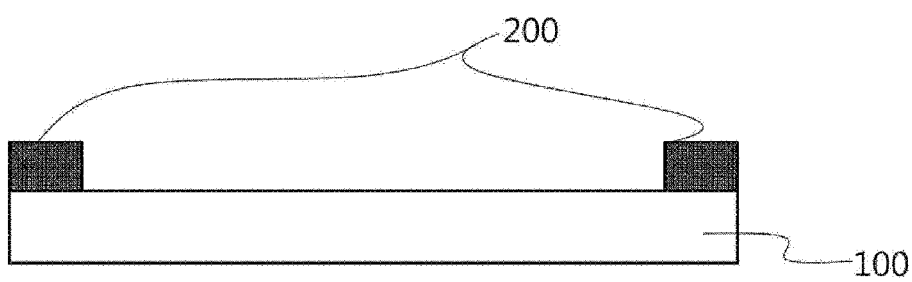
FIG. 2 is a cross-sectional view of the example of the separator for a lithium secondary battery according to the embodiment of the present invention.

The separator for a lithium secondary battery according to the embodiment of the present invention is schematically illustrated in FIGS. 1 and 2.

The drawings are merely presented to exemplify the present invention, and the scope of the present invention is not limited thereto. In the drawings of the present invention, sizes of elements may be exaggerated for convenience of explanation and may be different from actual ratios.

A plane view of the separator for a lithium secondary battery according to the embodiment of the present invention is illustrated in FIG. 1, and a cross-sectional view of the separator for a lithium secondary battery according to the embodiment of the present invention is illustrated in FIG. 2. Referring to FIG. 1, the separator for a lithium secondary battery according to the embodiment of the present invention is one in which a lithium metal layer 200 is formed on an outer circumferential surface of one side of a porous substrate 100, and, referring to FIG. 2, it may be confirmed that the lithium metal layer 200 in the separator for a lithium secondary battery according to the embodiment of the present invention is formed on the outer circumferential surface of the porous substrate 100 to have a window frame shape with an empty interior.

The empty interior in the shape of a window frame, which is formed by the lithium metal layer, may be a space in which the positive electrode is disposed. Thus, in a case in which the positive electrode is disposed in the empty interior in the shape of a window frame which is formed by the lithium metal layer, the lithium metal layer may surround edges of the positive electrode at a position spaced apart from the positive electrode.

A thickness of the lithium metal layer may be appropriately adjusted according to positive electrode capacity to be recovered after the degradation of the lithium secondary battery including the separator for a lithium secondary battery, and an upper limit of the thickness may be set to be equal to or less than a thickness of the positive electrode. For example, the lithium metal layer may have a thickness of 1 μm to 500 μm, particularly 5 μm to 100 μm, and more particularly 5 μm to 20 μm.

The lithium metal layer may have an area of 1% to 40%, particularly 2% to 20%, and more particularly 5% to 10% based on 100% of an area of the window frame shape with an empty interior.

In a case in which the area of the lithium metal layer to the area of the window frame shape is within the above ratio range, the lithium metal layer may include a lithium source in an amount capable of effectively supplementing lithium ions to the positive electrode during the degradation of the lithium secondary battery while not affecting a size or capacity of the positive electrode disposed in the interior of the window frame shape when a lithium secondary battery is prepared by using the separator.

A method of forming the lithium metal layer on one side of the porous substrate may be performed by a method in which a lithium metal film is laminated on one side of the porous substrate, or chemical vapor deposition (CVD) or physical vapor deposition (PVD) of lithium metal is performed.

In order to reduce the risk that the lithium metal reacts with surrounding moisture or air to form a lithium oxide or explode, the forming of the lithium metal layer may be performed under conditions in which the lithium metal is not in contact with the surrounding moisture and oxygen. For this purpose, the forming of the lithium metal layer may be performed in an inert gas atmosphere, and the inert gas atmosphere may be an argon or nitrogen atmosphere.

Also, the present invention provides a lithium secondary battery including the separator for a lithium secondary battery.

The lithium secondary battery includes a positive electrode; a negative electrode; and the separator for a lithium secondary battery which is disposed between the positive electrode and the negative electrode, wherein the lithium metal layer surrounds edges of the positive electrode at a position spaced apart from the positive electrode.

The separator includes a porous substrate; and a lithium metal layer formed on one side of the porous substrate, wherein the lithium metal layer is formed along an outer circumferential surface of the porous substrate and has a window frame shape with an empty interior.

The positive electrode may be disposed in the empty interior in the shape of a window frame which is formed by the lithium metal layer. Thus, in a case in which the positive electrode is disposed in the empty interior in the shape of a window frame which is formed by the lithium metal layer, the lithium metal layer may surround the edges of the positive electrode at the position spaced apart from the positive electrode.

Figure 3:
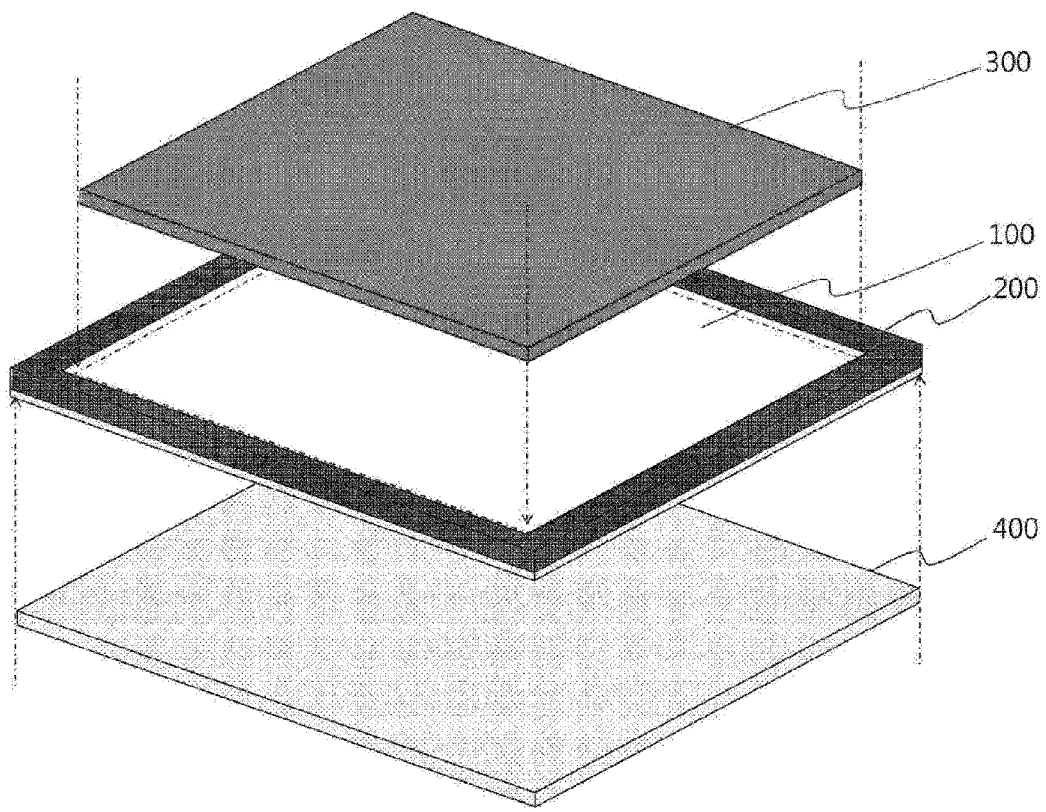
FIG. 3 illustrates an example of a stacked form of a positive electrode, a separator, and a negative electrode of a lithium secondary battery according to an embodiment of the present invention.

A stacked form of the positive electrode, the separator, and the negative electrode of the lithium secondary battery according to an embodiment of the present invention is schematically illustrated in FIG. 3.

Referring to FIG. 3, a lithium metal layer 200 is formed on an outer circumferential surface of a porous substrate 100, and the porous substrate 100 is exposed in an inner space of the lithium metal layer 200 formed on the outer circumferential surface. A positive electrode 300 is disposed in the inner space of the lithium metal layer 200, and a negative electrode 400 is disposed on another side of the porous substrate 100.

The positive electrode and the lithium metal layer may be spaced apart from each other by a distance of 20% to 12,000%, particularly 40% to 6,000%, and more particularly 100% to 3,000% when the thickness of the positive electrode is set to 100%.

The positive electrode and the lithium metal layer may be spaced apart from each other by a predetermined distance based on the thickness of the positive electrode. In a case in which the distance is excessively small, the positive electrode and the lithium metal layer may be in contact with each other during use of the lithium secondary battery, and, in a case in which the distance is excessively large, an effect of supplementing lithium to the positive electrode from the lithium metal layer may be reduced. Thus, in a case in which the positive electrode and the lithium metal layer are spaced apart from each other by a distance corresponding the distance within the above range based on the thickness of the positive electrode, a lithium source supply process after the degradation of the lithium secondary battery may be effectively performed while a spacing between the positive electrode and the lithium metal layer is stably maintained.

Also, a separation distance between the positive electrode and the lithium metal layer may be in a range of 10 μm to 10 mm, particularly 20 μm to 5 mm, and more particularly 50 μm to 2 mm. In a case in which the separation distance between the positive electrode and the lithium metal layer is within the above range, the spacing between the positive electrode and the lithium metal layer may be stably maintained and the lithium source supply process after the degradation of the lithium secondary battery may be effectively performed.

In an embodiment of the present invention, the positive electrode and the lithium metal layer may satisfy both the separation distance based on the thickness of the positive electrode and the separation distance according to a specific length value.

In the present invention, the expression "the positive electrode and the lithium metal layer are spaced apart from each other" denotes that there is no direct contact surface or contact point between the positive electrode and the lithium metal layer.

Typically, an area of a negative electrode of a lithium secondary battery is larger than that of a positive electrode, and the lithium metal layer included in the lithium secondary battery according to the embodiment of the present invention may have an area that is smaller than an area difference between the negative electrode and the positive electrode.

Since the lithium metal layer has an area that is smaller than the area difference between the negative electrode and the positive electrode and is formed on the outer circumferential surface of the porous substrate of the separator, there is no need to adjust the size or shape of the positive electrode according to the size or shape of the lithium metal layer, and thus, the lithium metal layer does not affect the capacity of the positive electrode.

The lithium metal layer may have an area of 1% to 40%, particularly 2% to 20%, and more particularly 5% to 10% based on 100% of the area of the positive electrode.

In a case in which the area of the lithium metal layer to the area of the positive electrode is within the above ratio range, the lithium metal layer may include a lithium source in an amount capable of effectively supplementing lithium ions to the positive electrode during the degradation of the lithium secondary battery while not affecting the capacity of the positive electrode.

Capacity of the lithium metal layer may be appropriately adjusted depending on the capacity of the positive electrode, and the capacity of the lithium metal layer may be adjusted so that the capacity of the lithium metal layer is in a range of 5% to 60%, particularly 10% to 50%, and more particularly 20% to 40% based on 100% of the capacity of the positive electrode.

The lithium metal layer may be connected to a lithium electrode terminal exposed to the outside of the lithium secondary battery. The lithium electrode terminal may be electrically connected to the positive electrode to allow lithium ions to be supplied from the lithium metal layer to the positive electrode.

That is, the lithium secondary battery may include a positive electrode terminal exposed to the outside of the lithium secondary battery, a negative electrode terminal, and the lithium electrode terminal connected to the lithium metal layer, and, in a case in which the lithium secondary battery is degraded, since the lithium electrode terminal and the positive electrode terminal are connected to supply lithium ions to the positive electrode by a current flowing between the lithium electrode and the positive electrode, recycling of the lithium secondary battery may be promoted.

Since the lithium metal layer is in the form of surrounding the positive electrode, the lithium ions may be more effectively transferred from the lithium metal layer to the positive electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

In the method of preparing a lithium secondary battery of the present invention, examples of the positive electrode active material may be lithium cobalt oxide ($LiCoO_2$); lithium nickel oxide ($LiNiO_2$); Li $[Ni_aCo_bMn_cM^1_d]O_2$ (where $M^1$ is at least one element selected from the group consisting of aluminum (Al), gallium (Ga), and indium (In), $0.3 \le a < 0.1$, $0 \le b \le 0.5$, $0 \le c \le 0.5$, $0 \le d \le 0.1$, and $a+b+c+d=1$); a layered compound, such as Li $(Li_eM^2_{f-e-f'}M^3_{f'})O_{2-g}A_g$ (where $0 \le e \le 0.2$, $0.6 \le f \le 1$, $0 \le f' \le 0.2$, $0 \le g \le 0.2$, $M^2$ includes manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \le i \le 0.3$); lithium manganese composite oxide represented by the chemical formula $LiMn_{2-j}M^5_jO_2$ (where $M^5$=Co, Ni, Fe, Cr, Zn, or Ta, and $0.01 \le j \le 0.1$) or $Li_2Mn_3M^6O_8$ (where $M^6$=Fe, Co, Ni, Cu, or Zn); $LiMn_2O_4$ having a part of lithium (Li) being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, sodium (Na), or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers;

conductive metal oxide such as titanium oxide; or polyphenylene derivatives may be used.

An aqueous dispersant or an organic dispersant, such as N-methyl-2-pyrrolidone, may be used as the dispersant.

The negative electrode may be prepared by a typical method known in the art, and, for example, the negative electrode active material and additives, such as a binder and a conductive agent, are mixed and stirred to prepare a negative electrode active material slurry, and a negative electrode collector may then be coated with the slurry, dried, and pressed to prepare the negative electrode.

As the negative electrode active material, amorphous carbon or crystalline carbon may be included, and, specifically, carbon such as non-graphitizable carbon and graphite-based carbon; a complex metal oxide such as $Li_uFe_2O_3$ ($0 \leq u \leq 1$), $Li_vWO_2$ ($0 \leq v \leq 1$), $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0<x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material may be used.

The binder may be used for maintaining a molded article by binding negative electrode active material particles, wherein the binder is not particularly limited as long as it is a typical binder used in the preparation of the slurry for a negative electrode active material, but, for example, a non-aqueous binder, such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene, or polypropylene, may be used, and at least one selected from the group consisting of an acrylonitrile-butadiene rubber, a styrene-butadiene rubber, and an acrylic rubber, which are aqueous binders, or a mixture of two or more thereof may be used. Since the aqueous binder, different from the non-aqueous binder, may be economical and environmentally friendly, may not be harmful to the health of workers, and may have a better binding effect than the non-aqueous binder, a ratio of the active material for the same volume may be increased. Thus, capacity of the lithium secondary battery may be increased, and the styrene-butadiene rubber may be preferably used as the aqueous binder.

The binder may be included in an amount of 10 wt % or less, for example, 0.1 wt % to 10 wt %, based on a total weight of the slurry for a negative electrode active material. When the amount of the binder is less than 0.1 wt %, it is not desirable because an effect obtained by using the binder is insignificant, and, when the amount of the binder is greater than 10 wt %, it is not desirable because capacity per volume may be reduced due to a relative decrease in the amount of the active material caused by the increase in the amount of the binder.

Any conductive agent may be used without particular limitation so long as it has conductivity without causing adverse chemical changes in the battery, and, examples of the conductive agent may be a conductive material such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode collector used in the negative electrode according to an embodiment of the present invention may have a thickness of 3 µm to 500 µm. The negative electrode collector is not particularly limited as long as it has conductivity without causing adverse chemical changes in the battery, and, for example, copper, gold, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

Any thickener typically used in a lithium secondary battery may be used as a thickener, and an example of the thickener may be carboxymethyl cellulose (CMC).

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in the present invention, any organic solvent typically used in an electrolyte solution for a secondary battery may be used without limitation as an organic solvent included in the electrolyte solution and, typically, any one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran, or a mixture of two or more thereof may be used. Specifically, ethylene carbonate and propylene carbonate, cyclic carbonates among the carbonate-based organic solvents, well dissociate the lithium salt in the electrolyte due to high permittivities as high-viscosity organic solvents, and thus, the cyclic carbonate may be preferably used. Since an electrolyte solution having high electrical conductivity may be prepared when the cyclic carbonate is mixed with low viscosity, low permittivity linear carbonate, such as dimethyl carbonate and diethyl carbonate, in an appropriate ratio, the cyclic carbonate may be more preferably used.

Selectively, the electrolyte solution stored according to the present invention may further include an additive, such as an overcharge inhibitor, that is included in a typical electrolyte solution.

The lithium secondary battery may be a stacked type or stack and folding type.

A shape of the lithium secondary battery is not particularly limited, but a cylindrical type using a can, a prismatic type, a pouch type, or a coin type may be used.

The lithium secondary battery may not only be used in a battery cell that is used as a power source of a small device, but may also be a unit cell in a battery module including a plurality of battery cells or a medium and large sized battery module used in a medium and large sized device.

Preferred examples of the medium and large sized device may be an electric vehicle, a hybrid electric vehicle, a plug-in hybrid electric vehicle, or a power storage system, but the medium and large sized device is not limited thereto.

MODE FOR CARRYING OUT THE INVENTION

Examples

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

<Preparation of Separator>

A lithium metal layer was formed by pressing and attaching a lithium metal having a width of 2 mm and a thickness of 20 μm to an outer circumferential surface of a porous separator having a 4 cm×5 cm sized polypropylene/polyethylene/polypropylene structure and a thickness of 30 μm to have a window frame shape. In this case, the lithium metal was attached such that the lithium metal was spaced apart from a positive electrode by a distance of 2 mm when the lithium metal layer surrounded the positive electrode having a size of 3 cm×4 cm, and a terminal for electrical connection was formed on the lithium metal layer.

<Preparation of Lithium Secondary Battery>

94 wt % of LiNiMnCoO$_2$ as a positive electrode active material, 3 wt % of carbon black as a conductive agent, and 3 wt % of polyvinylidene fluoride (PVdF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode having a thickness of about 70 μm.

While cutting the positive electrode to a size of 3 cm×4 cm and disposing it in an interior of the above-prepared porous separator on which the lithium metal layer was not formed, the positive electrode was disposed so that a distance between the positive electrode and the lithium metal surrounding the positive electrode in all directions was 2 mm and another side of the porous separator was allowed to be in contact with a graphite negative electrode. Then, a pouch-type cell was prepared by injecting an electrolyte solution in which 1 M LiPF$_6$ was dissolved in a solvent that was prepared by mixing ethylene carbonate (EC) and diethyl carbonate (DEC) in a volume ratio of 30:70.

Example 2

A separator and a lithium secondary battery were prepared in the same manner as in Example 1 except that, when the lithium metal layer surrounded the positive electrode having a size of 3 cm×4 cm, the lithium metal was attached such that the lithium metal was spaced apart from the positive electrode by a distance of 1 mm during the formation of the lithium metal layer in Example 1, and the positive electrode was disposed so that a distance between the positive electrode and the lithium metal surrounding the positive electrode in all directions was 1 mm while disposing the positive electrode in an interior of the porous separator on which the lithium metal layer was not formed.

Example 3

A separator and a lithium secondary battery were prepared in the same manner as in Example 1 except that a lithium metal layer was formed to have a width of 1 mm and a thickness of 20 μm in Example 1.

Example 4

A separator and a lithium secondary battery were prepared in the same manner as in Example 1 except that a lithium metal layer was formed to have a width of 3 mm and a thickness of 20 μm in Example 1.

Example 5

<Preparation of Separator>

A lithium metal layer was formed by pressing and attaching a lithium metal having a width of 2 mm and a thickness of 20 μm to an outer circumferential surface of a porous separator having a 5.5 cm×6.5 cm sized polypropylene/polyethylene/polypropylene structure and a thickness of 30 μm to have a window frame shape. In this case, the lithium metal was attached such that the lithium metal was spaced apart from a positive electrode by a distance of 10 mm when the lithium metal layer surrounded the positive electrode having a size of 3 cm×4 cm.

<Preparation of Lithium Secondary Battery>

A lithium secondary battery was prepared in the same manner as in Example 1 except that, while cutting the positive electrode prepared by the same method as in Example 1 to a size of 3 cm×4 cm and disposing it in an interior of the porous separator on which the lithium metal layer was not formed, the positive electrode was disposed so that a distance between the positive electrode and the lithium metal surrounding the positive electrode in all directions was 10 mm.

Comparative Example 1

A lithium secondary battery was prepared in the same manner as in Example 1 except that a porous separator having a 4 cm×5 cm sized polypropylene/polyethylene/polypropylene structure and a thickness of 30 μm was used instead of the separator having the lithium metal layer formed thereon in Example 1.

Comparative Example 2

<Preparation of Lithium Secondary Battery>

94 wt % of LiNiMnCoO$_2$ as a positive electrode active material, 3 wt % of carbon black as a conductive agent, and 3 wt % of polyvinylidene fluoride (PVdF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode.

After the positive electrode was cut to a size of 3 cm×4 cm and was allowed to be in contact with one side of a porous separator having a 4 cm×5 cm sized polypropylene/polyethylene/polypropylene structure and a thickness of 30 μm and another side of the porous separator was allowed to be in contact with a graphite negative electrode, a lithium metal having a width of 3 mm, a length of 5 mm, and a thickness of 20 μm was allowed to be in contact with one side (Al thin film) opposite to the other side of the positive electrode, on which the positive electrode mixture layer was formed, and was fixed by using a roll press. Then, a lithium secondary battery was prepared by injecting an electrolyte solution in which 1 M $LiPF_6$ was dissolved in a solvent that was prepared by mixing ethylene carbonate (EC) and diethyl carbonate (DEC) in a volume ratio of 30:70.

TABLE 1

|  | Separation distance between positive electrode and lithium metal layer | Area ratio of lithium metal layer (based on 100% of area of positive electrode) | Capacity ratio of lithium metal layer (based on 100% of area of positive electrode) |
| --- | --- | --- | --- |
| Example 1 | 2 mm | 20% | 30% |
| Example 2 | 1 mm | 20% | 30% |
| Example 3 | 2 mm | 10% | 15% |
| Example 4 | 2 mm | 30% | 45% |
| Example 5 | 10 mm | 20% | 30% |
| Comparative Example 1 | — | — | — |
| Comparative Example 2 | — | — | 30% |

Experimental Example

The lithium secondary batteries prepared in Examples 1 to 5 and Comparative Examples 1 and 2 were respectively charged and discharged at 1 C/1 C at 25° C. After it was confirmed that a capacity retention became 70% after 200 cycles, an electrical circuit was configured by using the terminal formed in the lithium metal of the lithium metal layer which is formed on the separator, and the lithium secondary batteries of Examples 1 to 5 and Comparative Example 2 were then further discharged by applying a current. Thereafter, the lithium secondary batteries of Examples 1 to 5 and Comparative Example 2 were respectively charged and discharged at 1 C/1 C at 25° C. to check a capacity retention after 100 cycles.

TABLE 2

|  | Capacity retention after 200 cycles | Capacity retention after additional 100 cycles |
| --- | --- | --- |
| Example 1 | 70.5% | 78.6% |
| Example 2 | 70.3% | 79.2% |
| Example 3 | 70.5% | 66.2% |
| Example 4 | 70.1% | 79.5% |
| Example 5 | 70.6% | 60.1% |
| Comparative Example 1 | 70.5% | 57.3% |
| Comparative Example 2 | 70.4% | 57.5% |

Referring to Table 2, the smaller the separation distance between the positive electrode and the lithium metal layer of the separator was, the higher the capacity retention after the additional discharge using the lithium metal was, and the higher the amount of the inserted lithium metal was, the higher the capacity retention after the additional discharge was. In a case in which the lithium metal was disposed on the rear side of the positive electrode collector as in Comparative Example 2, a degree of improvement in the capacity retention relative to Comparative Example 1, in which an additional discharge was not preformed, was insignificant even after the additional discharge using the lithium metal. The reason was analyzed that the supply of the lithium source to the positive electrode was not smooth.

The invention claimed is:

1. A lithium secondary battery comprising a positive electrode; a negative electrode; and a separator disposed between the positive electrode and the negative electrode,
wherein the separator comprises a porous substrate; and a lithium metal layer formed on one side of the porous substrate, and the lithium metal layer is formed along an outer circumferential surface of the porous substrate and has a window frame shape with an empty interior,
wherein the lithium metal layer surrounds edges of the positive electrode at a position spaced apart from the positive electrode,
wherein the lithium metal layer has an area of 1% to 40% based on 100% of an area of the positive electrode.

2. The lithium secondary battery of claim 1, wherein the positive electrode and the lithium metal layer are spaced apart from each other by a distance of 20% to 12,000% when a thickness of the positive electrode is set to 100%.

3. The lithium secondary battery of claim 1, wherein the positive electrode and the lithium metal layer are spaced apart from each other by 10 μm to 10 mm.

4. The lithium secondary battery of claim 1, wherein the lithium metal layer has a capacity of 5% to 60% based on 100% of capacity of the positive electrode.

5. The lithium secondary battery of claim 1, wherein the lithium secondary battery comprises a positive electrode terminal exposed to an outside of the lithium secondary battery, a negative electrode terminal, and a lithium electrode terminal connected to the lithium metal layer,
wherein the lithium electrode terminal and the positive electrode terminal are connected to supply lithium ions to the positive electrode by a current flowing between the lithium electrode and the positive electrode.

* * * * *